United States Patent [19]

Sjööquist

[11] Patent Number: 5,710,817
[45] Date of Patent: Jan. 20, 1998

[54] METHOD AND DEVICE FOR PREVENTING UNAUTHORIZED ACCESS TO A COMPUTER SYSTEM

[75] Inventor: Peter Bertil Tom Sjööquist, Linköping, Sweden

[73] Assignee: ICL Systems AB, Kista, Sweden

[21] Appl. No.: 551,232

[22] Filed: Oct. 31, 1995

Related U.S. Application Data

[63] Continuation of Ser. No. 211,728, filed as PCT/SE93/00702 Aug. 24, 1994, published as WO94/04972 Mar. 3, 1994, abandoned.

[30] Foreign Application Priority Data

Aug. 25, 1992 [SE] Sweden ................................ 9202427

[51] Int. Cl.$^6$ ........................ H04L 9/32; H04L 9/00; H04L 9/30
[52] U.S. Cl. .................... 380/25; 380/4; 380/23; 380/30; 380/49
[58] Field of Search ........................... 380/4, 23, 24, 380/25, 30, 49, 50; 235/379, 380

[56] References Cited

U.S. PATENT DOCUMENTS

| | | | |
|---|---|---|---|
| 4,801,787 | 1/1989 | Suzuki | 235/380 |
| 4,951,249 | 8/1990 | McClung | 364/900 |
| 5,018,096 | 5/1991 | Aoyama | 364/900 |
| 5,065,429 | 11/1991 | Lang | 380/25 |

FOREIGN PATENT DOCUMENTS

| | | |
|---|---|---|
| 0 427 465 A2 | 5/1991 | European Pat. Off. |
| 0 481 770 A2 | 4/1992 | European Pat. Off. |
| 3212785 A1 | 10/1986 | Germany |
| WO 92/04671 | 3/1992 | WIPO |

OTHER PUBLICATIONS

IEEE Communications Magazine, vol. 29, No. 6, pp. 42–48 (Jun. 1991), Hans-Peter Königs, "Cryptographic Identification Methods in the Process of Standardization".

"Using A Local Password For Two-Step Authentication", IBM Technical Disclosure Bulletin, vol. 35, N0. 4A, Sep. 1992, pp. 373–375.

*Primary Examiner*—Bernarr E. Gregory
*Attorney, Agent, or Firm*—Lee, Mann, Smith, McWilliams, Sweeney, & Ohlson

[57] ABSTRACT

In a method and a device for preventing unauthorised access to a computer system comprising at least one processing unit (1) or like, a disk unit (3), a display (5), and a keyboard (7), use is made of a floppy disk (9). Information in the form of a personal identification code containing the name of an authorised user and an access code encrypted by means of a one-way encrypting function, and an authenticity code formed by a system access code and at least the personal identification code are recorded on the floppy disk. After insertion of the floppy into the disk unit, the computer system is adapted, in starting-up, to read at least the personal identification code and the authenticity code; to check the authenticity code by means of the system access code and the information recorded on the floppy disk and used to form the authenticity code; to request, via the display, the user to enter his name and access code in non-encrypted form via the keyboards; to encrypt the access code entered by the user; to check the read name against the entered name and, respectively, the read, encrypted access code against the entered access code which is then encrypted by the computer system; and of give the user access to the computer system merely in case of a positive result of all three checks.

4 Claims, 4 Drawing Sheets

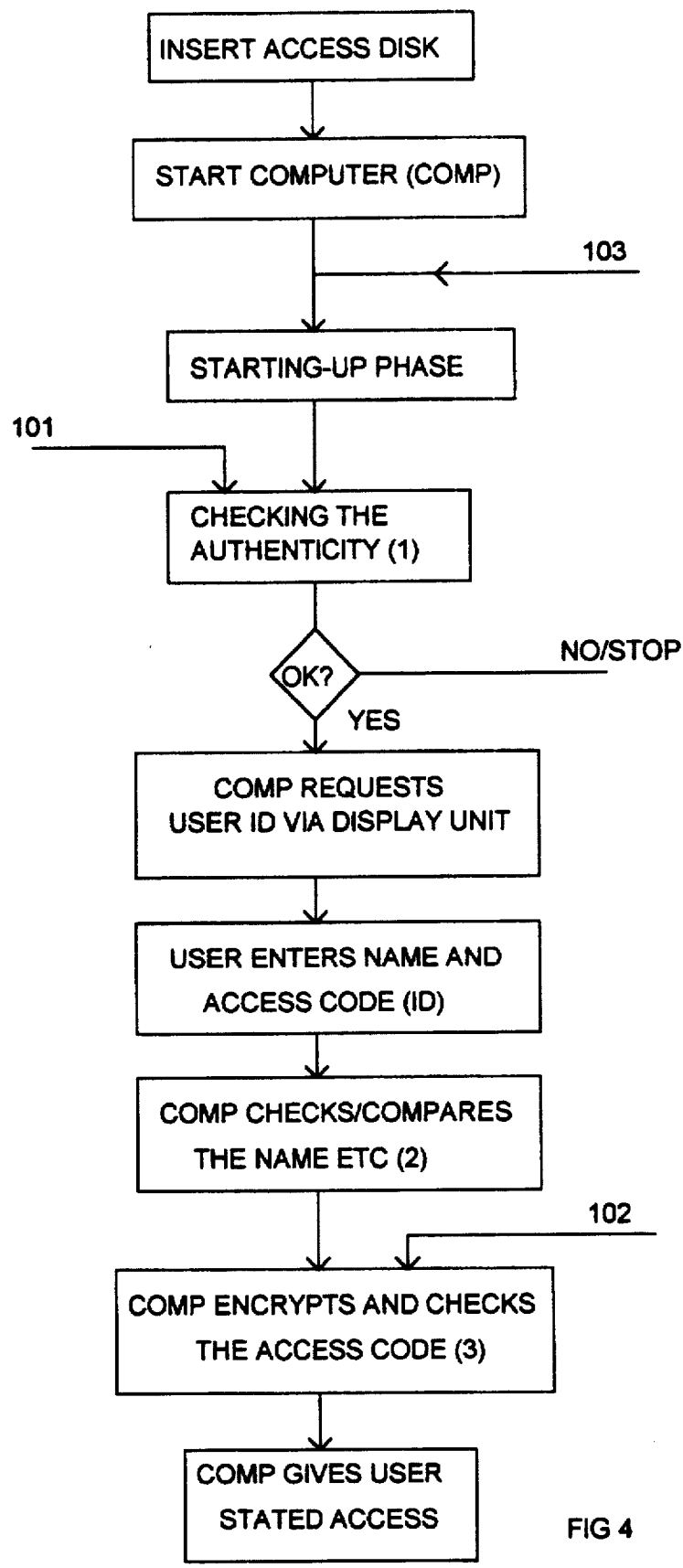

METHOD AND DEVICE FOR PREVENTING UNAUTHORIZED ACCESS TO A COMPUTER SYSTEM

This application is a continuation of application Ser. No. 08/211,728, filed as PCT/SE93/00702 Aug. 24, 1994, published as WO94/04972 Mar. 3, 1994, now abandoned.

The present invention relates generally to protection against unauthorised use of a computer system, e.g. a personal computer, comprising a processing unit or the like, a disk unit for floppy disks, a display and a keyboard.

There are prior art techniques of preventing such unauthorised access.

A first variant means that the user has to identify himself by a personal code via the keyboard, which code is checked by software stored in the computer system against one or more corresponding codes stored in the computer system. When the personal code and the corresponding code or one of the corresponding codes stored in the computer system conform to each other, the user is allowed to use the computer system, i.e. data or instructions entered by the user are accepted and processed. However, the security of this technique is not satisfactory.

A second, more reliable variant has therefore been developed. This requires the use of a card with a magnetic strip or an integrated circuit in which the identity information is stored. This requires, however, a special card reader reading the identity information into the computer system, which decides, based on either this information only or a combination of this information and a personal code entered via the keyboard, whether the user is authorised or not. One drawback of this solution is that it requires a special card reader.

A third variant, see DK-A-6229/89, tries to eliminate the last-mentioned drawback by providing a floppy disk with an integrated circuit containing a processing part and a memory part, and an interface via which the read and write equipment in a disk unit for floppy discs can transfer information between the integrated circuit and the computer system in which the disk unit is included. Of course, this eliminates the need of a separate card reader, but the special floppy disk will be complicated because of the arrangement of the integrated circuit and the associated interface, and since it requires a source of current supply of its own, for example a built-in battery.

The object of the present invention therefore is to provide a method for preventing unauthorised access to a computer system, and a device for carrying out the method, which assure high security but do not require any additional equipment in the form of e.g. cards, a card reader or special integrated circuits.

More precisely, according to the invention a personal identification code should be recorded on the floppy disk, said identification code preferably containing the user's name and an access code which is encrypted while using a one-way encrypting function. By name is here, of course, meant the user's name or the like which is unique for the user. The floppy disk may contain further information in addition to the personal identification code, as will be exemplified below. The floppy disk should also contain an authenticity code which is formed by means of a system access code which is, in turn, stored in a permanent memory in which it is not accessible to any user but the system administrator, i.e. the permanent memory is lockable by the system administrator. More precisely, the authenticity code is developed as a function of all the information recorded on the floppy disk (exclusive of the actual authenticity code), while using the system access code as a key. The function itself may be a one-way encrypting function.

In the method and the device according to the invention, the floppy disk with the above-mentioned codes is first inserted into the disk unit. Subsequently, the computer system is started and reads via its BIOS (Basic Input Output System) all the information of the floppy disk as well as the authenticity code which for authentication of the information read is checked by means of the system access code stored in the permanent memory, and all the information read, while using the same function as is used to produce the authenticity code recorded on the floppy disk.

At least in case of a positive result of this check, the BIOS of the system initiates a request to the user to enter, via the keyboard, his personal identification code.

Next, the name in this entered code is checked against the one read from the floppy disk and stored thereon as plain text, and after being encrypted by the one-way encrypting function, the entered access code is checked against the access code read from the floppy disc.

If one or some of the checks described above turn out negative, the user is not allowed to use the computer system. If, however, all checks turn out positive, the user is allowed to use the system.

In a preferred embodiment, if all three checks turn out positive, use is made of information which is read from the floppy disk and which defines the extent of the user's authorisation and is stored on the floppy disk in encrypted form, after decryption to then control what the user is allowed to do. The used encrypting decrypting key suitably is based on the user's name and the system access code stored in the lockable, permanent memory. This technique is above all applicable if not all users of the computer system should be allowed to perform all operations that are possible in the system.

Thus, the invention eliminates the possibility of copying a different user's access disk, and the possibility of changing the extent of the one's own authorisation.

Moreover, the access disk can contain information in the form of data that are necessary for preparing the computer system for operation to the extent of the user's valid authorisation, e.g. log-on information and other user-specific information. Furthermore, the floppy disk can contain information in the form of service routines which make it possible to read and update the information on the floppy disk, if the system access code is known.

The method and the device for preventing unauthorised access to a computer system comprising at least one processing unit or the like, a disk unit, a display and a keyboard, have thus according to the invention the features as defined in claims 1 and 6, respectively. Preferred embodiments are defined in the dependent claims.

The invention will now be described in more detail with reference to the accompanying drawings, in which:

FIG. 4 illustrates the access method according to the invention.

The invention is useful in an off-line computer, for example a personal computer, which may also be included in a network.

Figure 1:
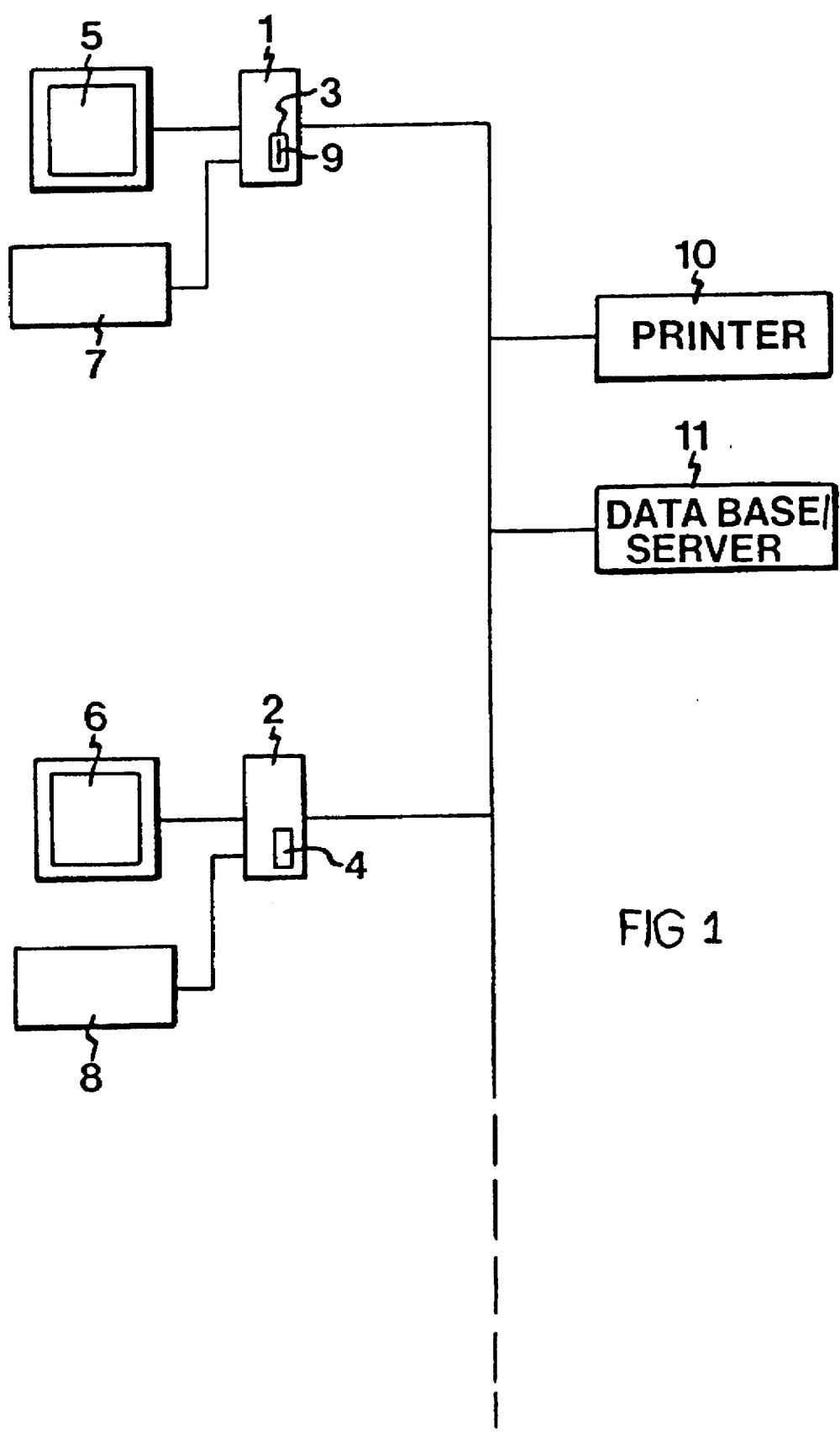
FIG. 1 illustrates a computer system to which the invention is applicable.

The network system illustrated in FIG. 1 of the drawings comprises personal computers 1, 2, each accommodating a disk unit 3, 4 and each having a display 5, 6 and a keyboard 7, 8. A floppy disk 9 is shown to be inserted into the disk unit 3. Joint resources in the network system are exemplified by a printer 10 and a data base unit or server 11.

According to the invention, use is made of a special floppy disk, below called access disk, for checking a user's authorisation to use the computer system via e.g. the computer 1. More precisely, the user's name or the like, which is unique for the user, is recorded on the access disk as plain text, i.e. non-encrypted. Moreover, an access code is recorded on the same access disk. In contrast to the name, this access code is recorded in encrypted form, a one-way encrypting function being used for the encryption, i.e. a function which does not allow or allows, this, however, being most unlikely, decryption of the result of the encryption. In practice, it should thus be impossible to derive the non-encrypted access code from the encrypted access code.

The name and the access code form a personal identification code which is unique for the user.

On the access disk there is also recorded an authenticity code formed by means of a system access code which, in turn, is stored in an available permanent memory in which it is not accessible to any user but the system administrator. The permanent memory can thus be locked by the system administrator.

Moreover, the access disk can advantageously contain information which is recorded in encrypted form and states to what extent the authorised user may use the computer system. The question whether the user should have access to e.g. serial or parallel ports, as well as the length of the access time and the allowed software may here be involved.

Figure 2:
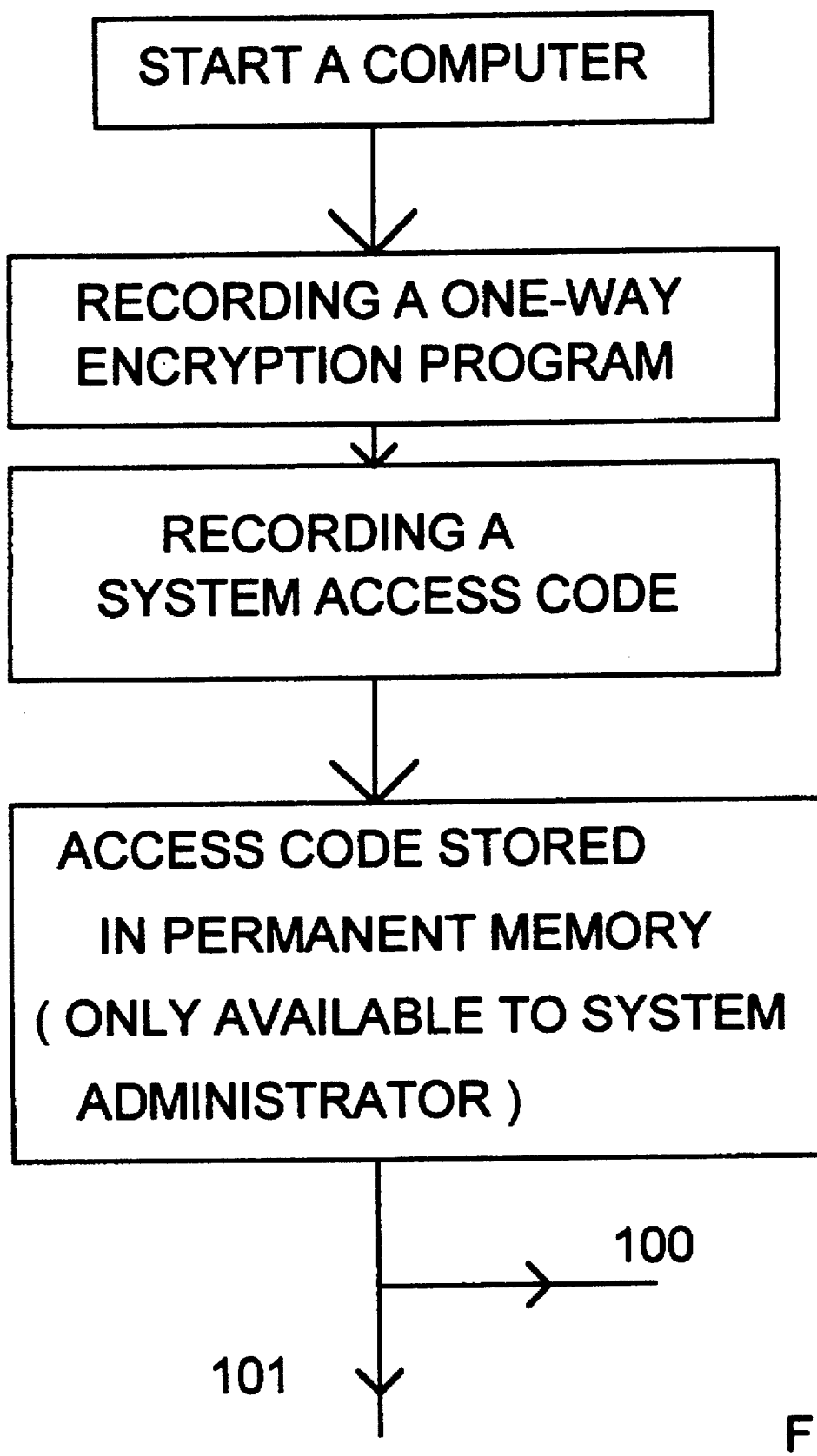
FIG. 2 illustrates an initial phase carried out by a system administrator.
Figure 3:
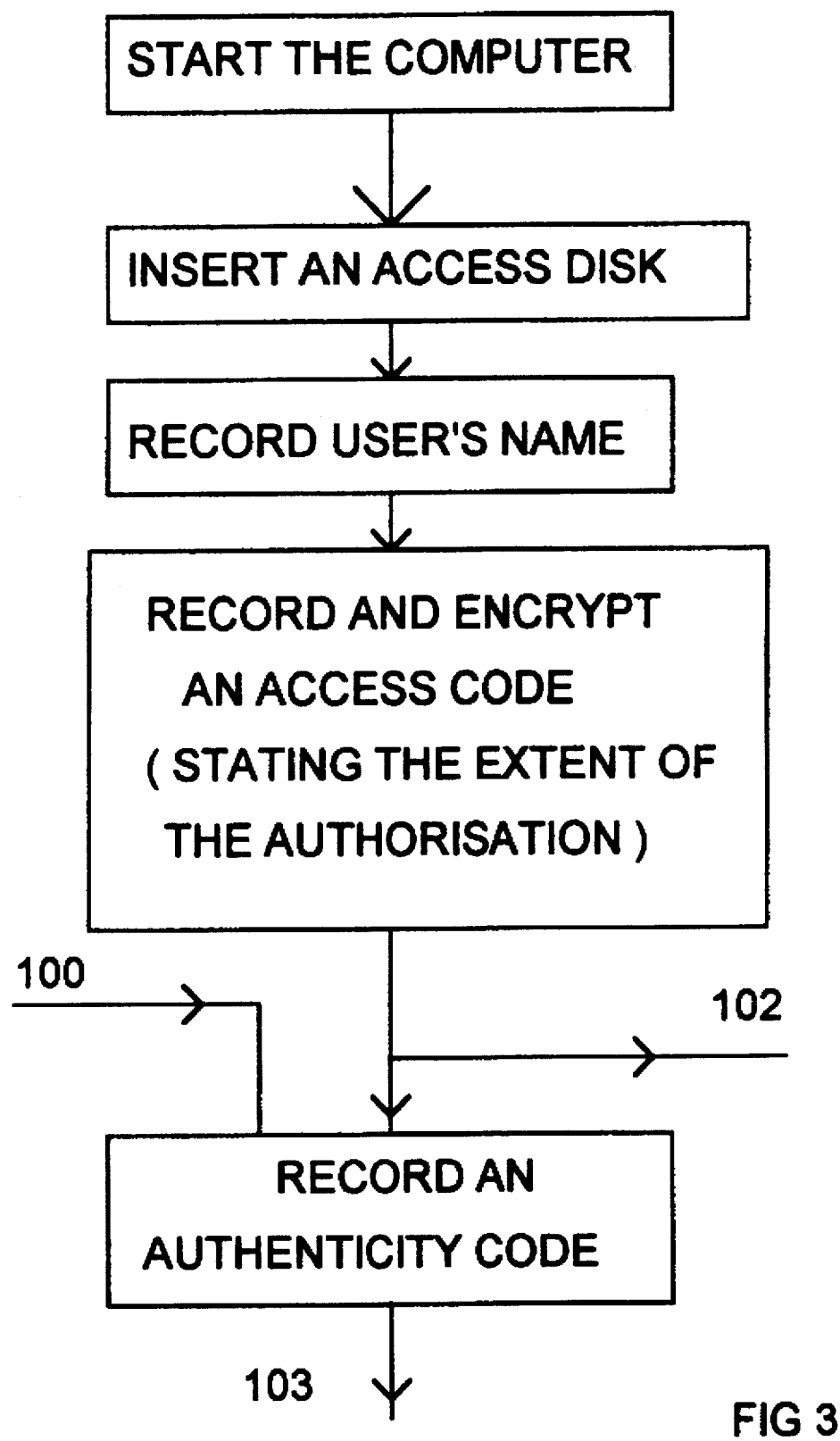
FIG. 3 illustrates recording of codes onto an access disk.

In each personal computer 1, 2, there is thus a lockable memory for storing the system access code which can be unique for the system administrator preparing the access disks, and which can be combined with the authorised user's name for forming an encrypting/decrypting key for said information stating to what extent the authorised user should be allowed to use the computer system. The flow charts illustrated in FIGS. 2–4 illustrate the above processes and the access method described in the following.

The device described above functions as follows.

1. An authorised user who wishes to use e.g. the personal computer 1 inserts his access disk 9 into the disk unit 3 before start-up of the computer 1.

2. In the subsequent start-up of the computer 1, its BIOS will provide reading of the authenticity code from the access disk 9 inserted into the disk unit 3, and all the information recorded thereon, possibly except the above-mentioned data for permitting operation of the computer system to the extent of the user's authorisation.

3. The BIOS of the computer 1 then checks the authenticity of the information read, by authenticating this with the system access code as a key. The authentication function can be a one-way encrypting function. The authentication thus results in an authenticity code which is compared with the authenticity code read from the floppy disk. If the result of the comparison and, thus, the check is negative, the user is informed via the display 5 that access to the system is not allowed. Alternatively, this message can be delivered only after execution of all the checks.

4. The BIOS of the computer 1 then generates, at least in case of a positive result of the first check, a request to the user via the display 5 that he should enter his name or the like, as well the access code in non-encrypted form via the keyboard 7.

5. The BIOS of the computer 1 then checks whether the entered name conforms with the name read from the access disk, and encrypts the entered, non-encrypted access code and, subsequently, checks whether the result of this encryption conforms with the encrypted access code read from the access disk.

6. Merely if all three described checks or comparisons yield a positive result, i.e. conformity prevails, the user is given access to the computer 1, and this is preferably shown via the display 5.

Since different users of the computer system should normally not have access to all the equipment thereof, the access disk suitably also contains the above-mentioned information stating to what extent the authorised user will be allowed to use the computer system. This information can be read from the access disk at the same time as the authenticity code and the personal identification code or, alternatively, be read only after these have been checked with a positive result. After establishing that the user is authorised and said information has been read, the information is decrypted by means of the decrypting key described above. The BIOS of the computer 1 subsequently uses the information to prepare the computer 1 for operation to the extent stated by said information. Additional necessary data for such preparing can also be recorded on the access disk.

It will be appreciated that the method and the device according to the invention afford high security against unauthorised use of the computer system, both regarding the access thereto and regarding the extent of the access. By means of the special access disk and the method of using it, the invention also ensures that this high security can be achieved without necessitating any additional equipment.

Several modifications of the particular embodiment described above are obvious to a person skilled in the art.

I claim:

1. A method for preventing access to a computer system, comprising a processing unit or the like, a disk unit for floppy disks, display and a keyboard, comprising the steps of recording, on a floppy disk, a personal identification code that includes the user's name and an encrypted personal access cede, the encryption being carried out by means of a one-way encryption function, recording on the same floppy disk, an authenticity code which is formed from the personal identification code and a system access code, which system access code is used as an encryption key, and is stored in a permanent memory accessible only to a system administrator, inserting the floppy disk into the disk unit before start-up of said computer system, in starting-up, said computer system reading at least the personal identification code in said information and the authenticity code from the floppy disk, said computer system then checking the authenticity of the read information by using the system access code stored in the permanent memory as an encryption key to forms respective authenticity code which is compared with the authenticity code read from the floppy disk, said computer system subsequently, at least in the case of the read information being authenticated, requesting the user via the display to enter his name and his personal access code in non-encrypted form via the keyboard, said computer system checking, after the entering has been carried out, the user's name read from the floppy disk against the user's name as entered via the keyboard, the computer system encrypting the entered non-encrypted personal access code by means of the one-way encrypting function, and, subsequently, checking the result against the encrypted personal access code read from the floppy disk, and said computer system giving the user access to the computer system only in the case of a positive result of all three checks, namely, the read information being authenticated, the read user's name corresponding to the keyboard entered user's named, and the read encrypted personal access code corresponding to the non-encrypted keyboard entered personal access code following encryption.

2. Method as claimed in claim 1, wherein information stating the extent to which the user is authorised to access the computer system is recorded in encrypted form on said floppy disk together with the personal identification code, wherein said computer decrypts the extent of use information in the case of said positive result of all three checks, and wherein the computer system gives the user access to the extent stated by information.

3. Method as claimed in claim 2, wherein the information about the extent of use of the authorisation is encrypted and decrypted by means of an encrypting key which is a function of the user's name and the system access code lockably stored in the computer system.

4. Method as claimed in claim 1, comprising recording, on the floppy disk, additional information which in combination with the system access code permits updating of the contents of said floppy disk.

* * * * *